United States Patent
Okamoto et al.

(10) Patent No.: US 6,445,137 B1
(45) Date of Patent: Sep. 3, 2002

(54) DIELECTRIC BARRIER DISCHARGE LAMP APPARATUS

(75) Inventors: Masashi Okamoto, Akashi; Kenichi Hirose; Takashi Asahina, both of Takasago, all of (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/582,218

(22) PCT Filed: Aug. 9, 1999

(86) PCT No.: PCT/JP99/04289

§ 371 (c)(1),
(2), (4) Date: Jul. 20, 2000

(87) PCT Pub. No.: WO01/11927

PCT Pub. Date: Feb. 15, 2001

(51) Int. Cl.[7] .............................................. H05B 41/00
(52) U.S. Cl. ......................... 315/246; 315/250; 315/260
(58) Field of Search ................................. 315/246, 260, 315/250, 254, 255

(56) References Cited

U.S. PATENT DOCUMENTS

| | | | |
|---|---|---|---|
| 4,983,881 A | 1/1991 | Eliasson et al. | |
| 5,214,344 A | 5/1993 | Kogelschatz | |
| 5,604,410 A | 2/1997 | Vollkommer et al. | |

FOREIGN PATENT DOCUMENTS

| | | |
|---|---|---|
| JP | 05-074587 | 3/1993 |
| JP | 06-163006 | 6/1994 |
| JP | 08-031585 | 2/1996 |
| JP | 08-096766 | 4/1996 |
| JP | 08-146198 | 6/1996 |
| JP | 10-123298 | 5/1998 |
| JP | 01-243363 | 9/1999 |

OTHER PUBLICATIONS

Discharge Handbook, pp. 262–272.

*Primary Examiner*—David Vu
(74) *Attorney, Agent, or Firm*—Nixon Peabody LLP; David S. Safran

(57) ABSTRACT

Dielectric-barrier discharge lamp light source equipment having a plurality of dielectric-barrier discharge lamps (B), each of which has a discharge plasma space (G) filled with a discharge gas in which a dielectric-barrier discharge will produce excimer molecules and a dielectric (D) located between the discharge gas and at least one of two electrodes (E) to induce the discharge phenomenon in the discharge gas, and also a power supply to impress a high voltage on the electrodes (E) of the dielectric-barrier discharge lamps, in which the power supply means is divided into a single power supply front stage (M) and multiple power supply back stages (S), one for each of the dielectric-barrier discharge lamps (B), with the power supply front stage (M) providing a common direct current power supply voltage (1) to each of the power supply back stages (S) and each of the power supply back stages (S) transforming the direct current power supply voltage (1) to an alternating current high voltage (H) of roughly periodic waveform via a switching element and a step-up transformer (T), and impressing that alternating current high voltage (H) on the electrodes (E) of the corresponding dielectric-barrier discharge lamps (B), such that the frequency of the alternating current high voltage (H) of each of the power supply back stages (S) is independently adjustable and the common direct current power supply voltage (1) of the power supply front stage (M) is adjustable.

3 Claims, 7 Drawing Sheets

DIELECTRIC BARRIER DISCHARGE LAMP APPARATUS

FIELD OF TECHNOLOGY

This invention concerns light source equipment that includes what is called a dielectricbarrier discharge lamp, which is a type of discharge lamp used, for example, as a source of ultraviolet radiation for photochemical reactions, in which excimer molecules are formed by dielectric-barrier discharge, and which uses light emitted from the excimer molecules.

BACKGROUND OF TECHNOLOGY

Technical literature explaining the technology involved in the dielectric-barrier discharge lamps with which this invention is concerned can be found in, for example, JPO kokai patent report H2-7353. This document describes an emitter that produces light by causing the formation of excimer molecules by means of a dielectric barrier discharge (also known as ozonizer discharge or silent discharge; see Denki Gakkai, "Discharge Handbook," revised edition, 7th printing, June 1989, p. 263) in a discharge chamber filled with a discharge gas that forms excimer molecules, and using the light radiated by those excimer molecules.

Dielectric-barrier discharge lamps as described above, and light source equipment containing such lights, have a number of advantages not found in conventional low-pressure mercury discharge lamps and high-pressure arc discharge lamps, and so have a variety of potential applications. One of the most important of these, given the mounting interest in the issue of environmental pollution in recent years, is the decontamination of materials by means of photochemical reactions using ultraviolet radiation. Consequently, there is unusually strong demand for dielectric-barrier discharge lamp light source equipment with high outputs and broad areas of illumination.

One proposal in line with this demand is found in JPO kokai patent H4-229671, which describes a constitution that enlarges the light source and expands the area of illumination by lighting multiple dielectric-barrier discharge lamp in parallel. There are, however, a number of major, unresolved problems in such attempts to use conventional technology. The first problem is that it is difficult, when illuminating a broad area, to make the illumination energy density uniform or to make the light adjustable. The second problem is greater economy is sought as the output is increased and the area of illumination is enlarged, or in other words as the electrical power of the equipment is increased. The third problem is that, as the output is increased and the area of illumination is enlarged, the heat generated by the lamp increases and its service life grows shorter.

Now, the reason for the necessity of being able to adjust the light within the first problem is simply explained. The function of treating materials using ultraviolet light from dielectric-barrier discharge lamps depends on highly complicated and precise photochemical reactions; in order to obtain the desired treatment effect in materials of large area, it is necessary that the illumination energy density distribution not be greater or less than the desired distribution. In the event that the illumination energy density is inadequate, the effect of illumination is low, which is clearly a problem. In the event that the illumination energy density is excessive, problems are caused by excessive reactions that go beyond the proper limits. For example, the breakdown products of the ultraviolet light illumination may react again and undergo unintended molecular synthesis, or an uneven layer of impurities may be formed on the surface of the material being treated. Accordingly, there is a permissible range that depends on the sort of treatment to be performed, and to avoid illumination energy density distribution that is not greater or less than the desired distribution, the ideal dielectric-barrier discharge lamp should have the function of adjusting the illumination energy density to fit the permissible range.

Moreover, in dielectric-barrier discharge lamps, as in other lamps, there are variable factors in the intensity of light emitted. The first variable factor is variation of the period of time needed for electrical and thermal stabilization after the lamp is lighted. The second variable factor is the period between the lamp being in new condition to the end of its service life. The function of adjusting the illumination energy density is needed to correct for these variables and maintain the desired illumination energy density.

A proposal to resolve the first problem mentioned above, which is the difficulty when illuminating a broad area or making the illumination energy density uniform and making the light adjustable, was made in JPO kokai patent H8-146198, but that did not include positive solutions to the second problem or the third problem.

In order to resolve the third problem mentioned above, it is necessary to improve the lighting efficiency of the lamp. The conditions for improvement of the lighting efficiency of lamps are explained below.

Dielectric-barrier discharge lamps (B, B1, B2 . . . ) have a discharge plasma space (G) and one or two dielectrics sandwiched between electrodes (Ea, Eb). FIG. 1 shows a single dielectric-barrier discharge lamp with two dielectrics (D). In FIG. 1, by the way, the lamp seal (6) also serves as the dielectric (D).

When lighting up the dielectric-barrier discharge lamp (B), a high-frequency, alternating current of, for example 10 to 200 kHz and 2 to 10 kV is impressed on the electrodes (Ea, Eb). However, because of the dielectric (D) between the discharge plasma space (G) and the electrodes (Ea, Eb), current does not flow directly from the electrodes (Ea, Eb) to the discharge plasma space (G); the current flows by means of the action of the dielectric (D) as a condenser. In other words, a charge equal in size and opposite in sign to that on electrodes (Ea, Eb) is induced on the discharge plasma space side of the dielectric (D) because of polarization of the dielectric; The discharge occurs between the dielectric (D) that faces across the discharge plasma space (G).

Little current flows along the discharge plasma space (G) side of the dielectric (D); when discharge occurs, the charge induced on the discharge plasma space (G) side of the dielectric (D) is neutralized by the charge moved by the discharge, and the electrical field within the discharge plasma space (G) is reduced. For that reason, the current stops even if the voltage continues to be impressed on the electrodes (Ea, Eb). But when the voltage impressed on the electrodes (Ea, Eb) rises again, the discharge current continues. When the discharge ceases after having occurred, there is no further discharge until the polarity of the voltage impressed on the electrodes (Ea, Eb) has reversed.

In the case of a dielectric-barrier discharge lamp in which xenon gas, for example, is sealed, the xenon gas is dissociated into ions and electrons by the discharge, and becomes xenon plasma. When the xenon plasma is excited to a specified energy level, excimer molecules are formed within the plasma. Xenon excimers divide after a certain lifespan, but the energy released at that time is emitted as a photon of vacuum ultraviolet wavelength. To make a dielectric-barrier discharge lamp work efficiently as a vacuum ultraviolet light source, it is necessary to form the excimer molecules efficiently.

The greatest obstacle to efficient formation of excimer molecules during discharge is the excitation of the discharge plasma to energy levels that do not contribute to the formation of excimer molecules.

The movement of discharge plasma electrons immediately after discharge begins is collective, and the energy is high but the temperature is low. In this state, the discharge plasma has a high probability of transition to the resonant state required for formation of excimer molecules. If the discharge time is prolonged, however, the movement of the plasma electrons gradually becomes thermal. That is, it reaches a state of thermal equilibrium known as a Maxwell-Boltzmann distribution; the plasma temperature rises, and there is an increased probability of transition to a state of higher excitation where excimer molecules cannot form.

Moreover, sometimes when excimer molecules have been formed, a subsequent discharge will break down the excimer molecules before their lifespan elapses and they divide naturally by emitting the desired photon. In fact, in the case of xenon excimers, a period of about 1 ps is required between the beginning of discharge and emission of a vacuum ultraviolet photon, and a subsequent discharge or redischarge during that period reduces the efficiency of excimer light emission.

In other words, once discharge had commenced, it is most important to reduce as much as possible the energy of subsequent discharges.

Even in the event that the discharge time is short, if the energy injected during the discharge period is too great, there is similarly an increased probability of transition to a state of high excitation. Plasma that has transitioned to a state of high excitation moderates itself by emission of infrared radiation, which just raises the temperature of the lamp and does not contribute to excimer light emission.

That is, the discharge must be driven so as to suppress the excitation of discharge plasma to energy levels that do not contribute to the formation of excimer molecules. That point is one that cannot be satisfied by conventional dielectric-barrier discharge lamp light source equipment.

JPO kokai patent report H1-243363 is a proposal to achieve excimer light emission with high efficiency by means of all pulse discharges, including dielectric-barrier discharges. This follows the condition stated above that once a discharge has begun, the energy of the subsequent discharge is reduced as much as possible. However, what is described in this proposal is which parameters to control to increase the efficiency of excimer light emission; there is no specific mention of the effective conditions for those parameter values. Particularly in the case of dielectric-barrier discharges, there is little freedom for control of the voltage that has to be impressed and the current that has to be injected into the discharge plasma space through the dielectric; it is extremely difficult to discover the optimum conditions, but no information on that is contained in this proposal.

Proposals to improve the drive waveform of fluorescent lights using dielectric-barrier discharge include JPO kokai patent H6-163006. That describes improvement of the luminance of fluorescent lights by driving them with a stream of short pulses of positive and negative polarity or with alternating-current short waveforms. In connection with the frequency and duty cycle, experimental results on variation of luminance relative to variation of the voltage impress are described, and it is explained that efficiency is improved relative to conventional sine-wave drive. Practical power supplies, however, contain high-voltage transformers, and it is impossible to impress an ideal stream of short pulses or short waveforms; because of interaction of the output impedance of the power supply and the inductance of the lamp, the waveform is rounded and resonance causes a partially sine-wave shaped voltage to be impressed. With the premise that there is inevitable divergence from the ideal short waveform in practical power supplies of this sort, it is not easy to design and manufacture an economical and useful light source while keeping the harmful component of the divergence within acceptable limits, and that proposal does not state specific guidelines for resolving that problem.

There are proposals to improve the efficiency of dielectric-barrier discharge lamps, such as JPO patent report H8-508363. However, this proposal says nothing about specific items that are truly effective in achieving control of the excitation of discharge plasma to energy levels that do not contribute to formation of excimer molecules, so as to form excimer molecules efficiently.

In order to form excimer molecules efficiently while limiting the excitation of discharge plasma to energy levels that do not contribute to the formation of excimer molecules, it is best to raise the voltage impressed on the lamp at a finite rate of increase and to end the discharge as quickly as possible once the voltage for commencement of discharge is reached and discharge begins.

The operation of the electrical circuitry of a dielectric-barrier discharge lamp is shown in FIG. 2. The discharge path (7) of the discharge plasma space (G) can be thought of as connected in series with a resistor (8) and a switch (9). The dielectric-barrier discharge lamp (B) has dielectric (D) between the electrodes (Ea, Eb) and the discharge plasma space (G), and it functions as a condenser within the electrical circuitry. In the event that there are two pieces of dielectric, however, the two condensers can be thought of as a single condenser (10).

Because the structure has this condenser inserted in series with the discharge plasma space (G), discharge current flows through the dielectric-barrier discharge lamp (B) only for a period immediately after the change in polarity of the voltage impressed on the lamp, and a non-discharge period occurs naturally, even without impressing voltage on the lamp as a pulse voltage that has a rest period that is essentially zero voltage. Moreover, discharge does not occur until the voltage of the discharge plasma space (G) reaches the voltage for the commencement of discharge, and so it is not necessary for the rise or fall of the voltage impressed on the lamp to be rapid.

The discharge plasma space (G) itself forms a condenser (11), and when discharge begins, almost all the energy stored in this condenser is expended, and so once the discharge begins, there is no need for additional current to the dielectric-barrier discharge lamp (B) from the power supply.

The unit area of the lamp wall surface is considered next. The voltage for the commencement of discharge is decided almost automatically when the gas pressure and the discharge gap are decided. And because the size of the discharge gap determines the static capacity of the condenser (11) formed by the discharge plasma space, the minimum energy that can be put into the plasma between the commencement and completion of a single discharge is the energy of a full discharge of the charge stored in the condenser (11) formed by the discharge plasma space. That determines the constitution of the lamp. It was stated above that in order to form excimer molecules efficiently, the excitation of discharge plasma at energy levels that will not contribute to the formation of excimer molecules is controlled. That control is best achieved through the conditions for discharge of that minimum energy. However, the conditions for discharge of that minimum energy can be realized in an ideal fashion by very slowly raising the voltage impressed on the lamp, and then discharging it, using a power supply with an output impedance that is quite large.

There are, however, a number of problems in applying such power supply equipment as actual light source equipment. That is, there is the problem that because of the cyclical repetition of the discharge it is difficult to achieve the speed of operation when the output impedance is large, and the problem that under the conditions for discharge of the minimum energy, there is liable to be a lack of uniformity of discharge within each individual lamp because of the lack of uniformity of the location of the discharge gap within the lamp.

This latter problem is none other than the first of the problems listed previously, that it is difficult, when illuminating a broad area, to make the illumination energy density uniform or to make the light adjustable. That is, if one attempts to improve the lighting efficiency of the lamp in order to resolve the third problem listed previously, which is that as the output is increased and the area of illumination is enlarged the heat generated by the lamp increases and its service life grows shorter, one will actually exacerbate the first problem, and consequently it is extremely difficult to resolve both problems simultaneously.

Accordingly, in order to have practical light source equipment that uses a means of power supply with an output impedance small enough to realize the necessary light volume and that has surplus capacity to produce an even discharge at all surfaces of the dielectric-barrier discharge lamp, it is necessary to increase the voltage impressed on the lamp beyond the conditions for the minimum energy discharge mentioned above, and also to set correctly the conditions for the permissible range for lowering the efficiency of excimer emission by raising the voltage impressed on the lamp. Normally the appropriate range for the voltage impressed on the lamp is not a broad one.

In dealing with the first problem mentioned above, it is necessary to consider not only the problem of the lack of uniformity of discharge within each individual lamp because of the lack of uniformity of the location of the discharge gap within the lamp, but also the problem of lack of uniformity caused by differences of lighting efficiency among the different lamps.

The only way to make up for this lack of uniformity caused by differences of lighting efficiency among the different lamps is to adjust individually the power injected into each lamp. As stated above, however, the appropriate range for the voltage impressed on the lamp is not broad, and so it is not appropriate to adjust the power injected into each lamp by means of the voltage impressed on the lamp. That is because if the voltage impressed on the lamps is increased and decreased to correct for the lack of uniformity caused by differences of lighting efficiency among the different lamps, the voltage will usually fall outside the appropriate range.

The task to be handled by this invention is to provide a dielectric-barrier discharge lamp light source equipment to solve the difficulty, when illuminating a broad area, of making the illumination energy density uniform or making the light adjustable, and to solve at the same time the problem that as the output is increased and the area of illumination is enlarged, the heat generated by the lamp increases and its service life grows shorter, and that will achieve these solutions economically.

SUMMARY OF THE INVENTION

In order to resolve these problems, the dielectric-barrier discharge lamp light source equipment of this invention has the following constitution.

(1) Dielectric-barrier discharge lamp light source equipment comprising dielectric-barrier discharge lamps (B, B1, B2 . . . ) that have a discharge plasma space (G) filled with a discharge gas in which a dielectric-barrier discharge will produce excimer molecules and a dielectric (D) located between the discharge gas and at least one of two electrodes (Ea, Eb) to induce the discharge phenomenon in the discharge gas, and also a power supply to impress a high voltage on the electrodes (Ea, Eb) of the dielectric-barrier discharge lamps, in which the power supply means is divided into a power supply front stage (M) and power supply back stages (S, S1, S2 . . . ) with one of the power supply back stages (S, S1, S2 . . . ). For each of the dielectric-barrier discharge lamps (B, B1, B2 . . . ), with the power supply front stage (M) providing a common direct current power supply voltage (1) to each of the power supply back stages (S, S1, S2 . . . ) and each of the power supply back stages (S, S1, S2 . . . ) transforming the direct current power supply voltage (1) to an alternating current high voltage (H) of roughly periodic waveform by means of a switching element and a step-up transformer (T), and impressing that alternating current high voltage (H) on the electrodes (Ea, Eb) of the corresponding dielectric-barrier discharge lamps (B, B1, B2 . . . ), such that the frequency of the alternating current high voltage (H) of each of the power supply back stages (S, S1, S2 . . . ) is independently adjustable and the common direct current power supply voltage (1) of the power supply front stage (M) is adjustable.

(2) Dielectric-barrier discharge lamp light source equipment, in which the power supply front stage (M) supplies as common direct current power supply voltages both a direct current power supply voltage (2) for regular operation and a direct current power supply voltage (3) for lamp ignition to each of the power supply back stages (S, S1, S2 . . . ), with each of the power supply back stages (S, S1, S2 . . . ) having a lamp voltage selection switch circuit (X) to select either the direct current power supply voltage (2) for regular operation or the direct current power supply voltage (3) for lamp ignition, and the lamp voltage selection switch circuit (X) selecting the direct current power supply voltage (2) for regular operation when the dielectric-barrier discharge lamp is turned on or direct current power supply voltage (3) for lamp ignition during regular operation, such that the common voltage is transformed to an alternating current high voltage (H) of roughly periodic waveform based on the voltage selected.

(3) Dielectric-barrier discharge lamp light source equipment, in which the power supply front stage (M) supplies as common direct current power supply voltages both a modulated low-level direct current power supply voltage (4) and a modulated high-level direct current power supply voltage (5) to each of the power supply back stages (S, S1, S2 . . . ), with each of the power supply back stages (S, S1, S2 . . . ) having a lamp voltage selection switch circuit (Y) to select either the modulated low-level direct current power supply voltage (4) or the modulated high-level direct current power supply voltage (5), and the lamp voltage selection switch circuit (Y) cyclically alternating between two states, namely the state when the modulated low-level direct current power supply voltage (4) is selected and the state when the modulated high-level direct current power supply voltage (5) is selected, such that the common voltage is transformed to an alternating current high voltage (H) of roughly periodic waveform based on the voltage selected, and the ratio of length of continuation of the two states can be adjusted.

OPTIMUM EFFECT OF IMPLEMENTATION OF INVENTION

Figure 1:
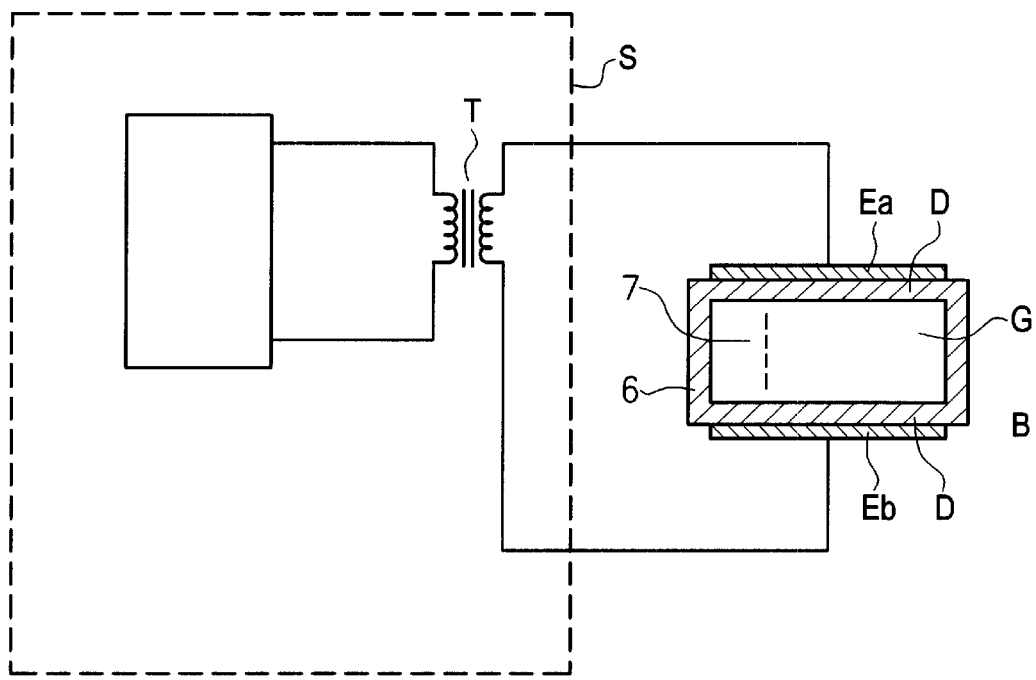
FIG. 1 is a diagram showing a dielectric-barrier discharge lamp with two dielectrics.
Figure 2:
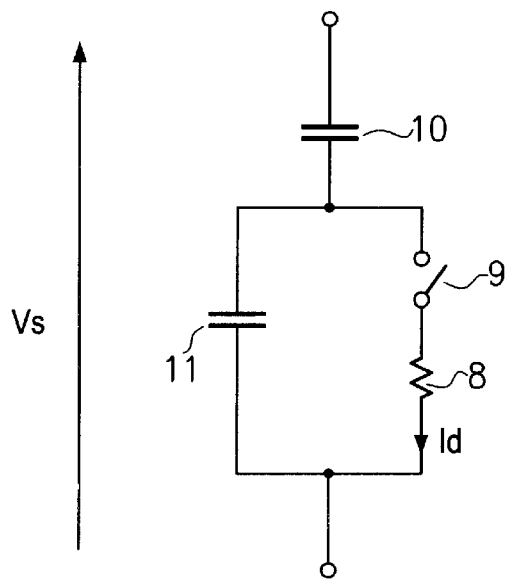
FIG. 2 shows an equivalent system for a dielectric-barrier discharge lamp.

The mode of implementation of the invention is explained below with reference to FIG. 3.

In the power supply front stage (M), the alternating current voltage input from the commercial power line (12) is converted to a direct current voltage line (15) by a smoothing condenser (14) and a rectifier circuit (13) comprising, for example, a diode bridge. This direct current voltage line (15) is connected to a switching element (16) using an FET, for example, a diode (19), a choke coil (20) and a smoothing condenser (21), thus making up a variable voltage direct current voltage source. Its output, a direct current power supply voltage (1), is supplied in common to the power supply back stages (S, S1, S2 . . . ) included within the light source unit (25).

Figure 3:
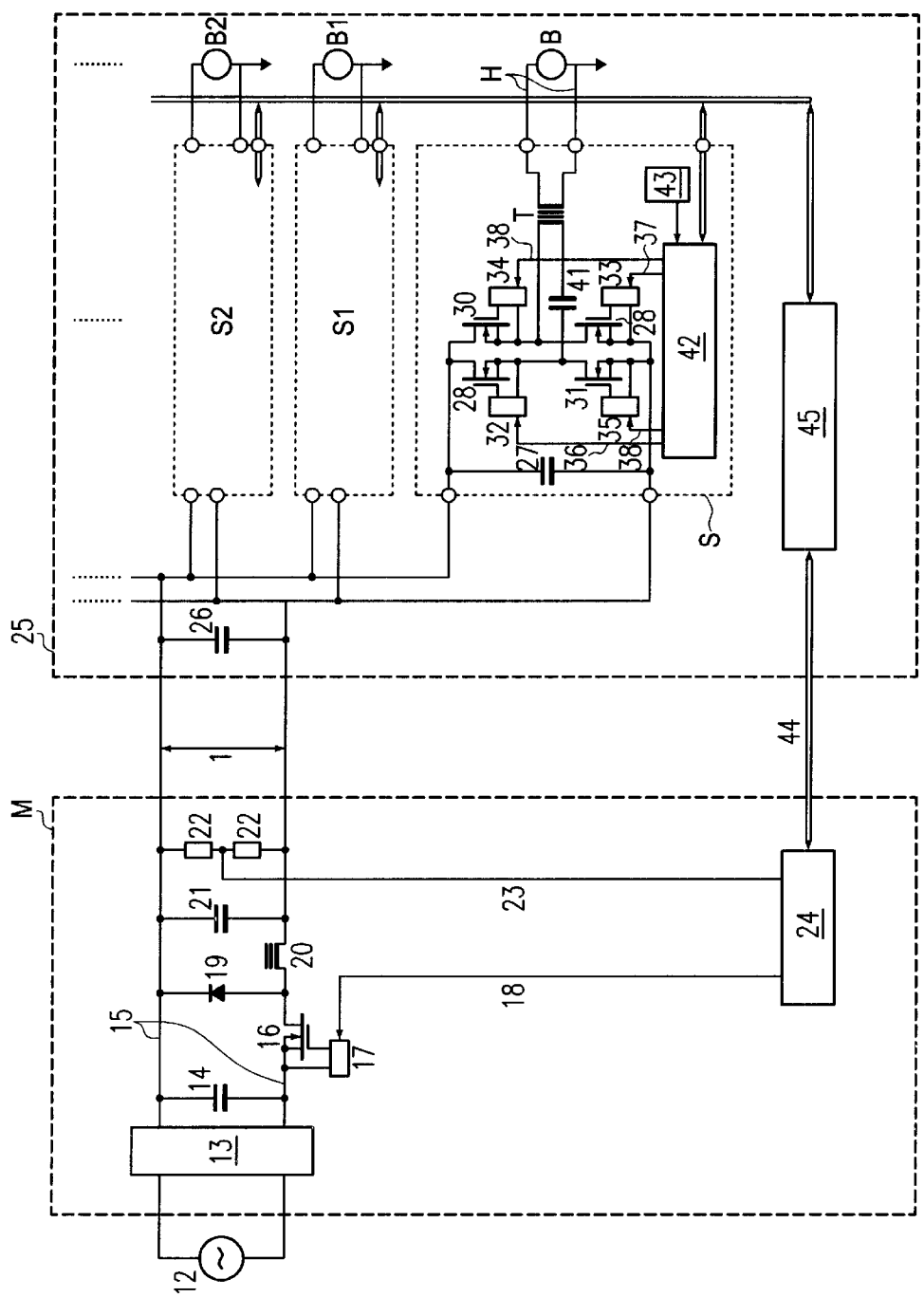
FIG. 3 is one example of a simplified circuit diagram of the dielectric-barrier discharge lamp light source equipment of this invention.

In this case, the variable voltage direct current voltage source in FIG. 3 is what is known as a step-down chopper circuit; it is possible to increase or decrease the output direct current power supply voltage (1) by increasing or decreasing the duty cycle of the short waveform gate signal (18) input to the gate drive circuit (17) attached to the switching element (16). The power supply front stage control circuit (24) starts and stops the operation of the variable voltage direct current voltage source and controls the stability of the output direct current source voltage and the production of the feedback-type gate signal (18) on the basis of a voltage measurement signal (23) from an output voltage detector circuit (22) that uses, for example, a resistance voltage divider. Now, in the event that there is some distance between the light source unit (25) and the power supply back stages (M), it is best to connect a smoothing condenser (26) where the direct current power supply voltage (1) is input to the light source unit (25).

Of the power supply back stages (S, S1, S2 . . . ), the constitution of only one power supply back stage (S) is shown in FIG. 3, but the others have the same constitution and operate in the same way.

In the power supply back stage (S), the direct current power supply voltage (1) is received by a bypass condenser (27) and connects to an inverter circuit made up of switching elements (28, 29, 30, 31) that use FET's, for example. The inverter circuit in FIG. 3 is what is called a full-bridge inverter, in which there are, associated with the switching elements (28, 29, 30, 31), a set of upper left and lower right inverter gate drive circuits (32, 33) and a pair of upper right and lower left inverter gate drive circuits (34, 35), with an alternating current voltage that changes between positive and negative polarity impressed on the primary side of the step-up transformer (T) by the gate signals (36, 37, 38, 39) such that the switching elements of each set are driven ON at the same time, with alternation between the sets driven ON. Now, a condenser (41) to prevent eccentric excitation may be inserted on the primary side of the step-up transformer (T).

An inverter gate signal generation circuit (40) to start and stop the inverter circuit and to produce the gate signals (36, 37, 38, 39) that alternately drive the switching elements (28, 29, 30, 31) ON as appropriate is included in the power supply back stage control circuit (42). The frequency of alternation between the sets of switching elements (28, 29, 30, 31) is set for the power supply back stage control circuit (42) by the frequency setting means (43). The light source unit control circuit (45) provides overall control, such as starting and stopping the inverter circuit, to the power supply back stage control circuits of each power supply back stages (S, S1, S2 . . . ) on the basis of the light source unit control signals (44) moving to and from the power supply front stage control circuit (24).

On the secondary side of the step-up transformer (T), the voltage is increased in proportion to the winding ratio, and an alternating current high frequency voltage (H) with polarity that changes between positive and negative is produced at a set frequency. The alternating current high voltage (H) from each power supply back stages (S, S1, S2 . . . ) is impressed on the electrodes of the corresponding dielectric-barrier discharge lamps (B, B1, B2 . . . ), lighting each lamp. At this time the step-up transformer (T) provides a common direct current power supply voltage (1) to the similarly constructed power supply back stages (S, S1, S2 . . . ), such that the amplitude of the alternating current high voltage (H) impressed on each lamp is roughly the same.

Accordingly it is possible to adjust the common direct current power supply voltage (1) in the power supply front stage (M) such that the voltage impressed on each dielectric-barrier discharge lamp meets the conditions stated above; that is, there is a margin for production of uniform discharges across the full surface of the dielectric-barrier discharge lamps, the voltage impressed on the lamp is higher than the minimum energy condition for discharge, and the drop in efficiency of excimer light emission due to the voltage impressed on the lamp being high is within the permissible range. This solves, within the first problem mentioned above, the problem of unevenness of discharge within a single lamp due to the effect of variation in the location within the lamp of the discharge gap, and also the third problem listed above, which is the problem that the lamp produces more heat and its life grows shorter as the output increases and the area of illumination increases, or in other words, as the equipment becomes larger.

Figure 8:
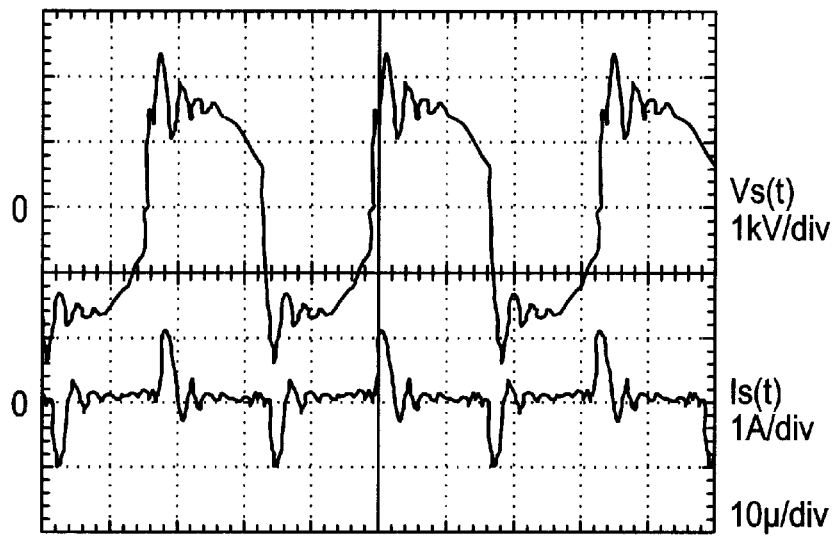
FIG. 8 shows an example of the measured values of the lamp voltage (Vs(t)) waveform and the lamp current (Is(t)) waveform.

FIG. 8, on the other hand, is an example of the lamp voltage waveform (Vs(t)), which is the alternating current high voltage (H) output from the power supply back stages (S), and the lamp current waveform (Is(t)) when a dielectric-barrier discharge lamp is lighted by means of this sort of full-bridge inverter. As is clear from the lamp current waveform (Is(t)) in FIG. 8, the lamp current flows only for an instant when there has been a sudden change in the lamp voltage waveform (Vs(t)). Accordingly, it is known that the power injected into the lamp is proportional to the number of sudden changes of the lamp voltage waveform (Vs(t)) per unit time, or to the frequency of the inverter circuit. This is a response to the fact that the dielectric-barrier discharge lamp (B) is made up, as stated above, of the condenser (10) which is the dielectric, and the condenser (11) which is the discharge plasma space (G).

Consequently, it is known that by means of setting the frequencies in each of the power supply back stages (S, S1, S2 . . . ), it is possible to adjust the frequencies of the inverter circuits and thus make minute adjustments to the power injected into each lamp. This solves, within the first problem mentioned above, the problem of lack of uniformity caused by differences of lighting efficiency among the different lamps.

Moreover, by concentrating the function of the variable voltage direct current voltage source in a single power supply front stage (M), it is possible to make common adjustments to the amplitude of the alternating current high voltage (H) impressed on all the dielectric-barrier discharge lamps (B, B1, B2 . . . ). This is clearly a simplification of the circuit compared with that given as an implementation in JPO kokai patent H8-146198. This solves the second problem mentioned above, which is the problem of improving economic properties while increasing the power of the equipment by increasing the power and increasing the area of illumination.

That is to say, the invention of this invention solves the first problem mentioned above, the second problem, and also the third problem.

The mode of implementation of the invention is explained below with reference to FIG. 4.

In dielectric-barrier discharge lamps, as in discharge lamps in general, the voltage impressed on the lamp when going from the unlighted state to the lighted state must be higher than that needed for normal operation. In light source equipment constituted as in FIG. 3, consider the situation when the direct current power supply voltage (1) of the power supply front stage (M) is increased from a low value in order to start up a lamp in the unlighted state, and one or another of the dielectric-barrier discharge lamps (B, B1, B2 . . . ) is lighted. When the lighting of the lamps has been accomplished, the voltage impressed on the lamps must be reduced to a value appropriate to normal operation, and so when the power supply front stage (M) has lowered the direct current power supply voltage (1), it is possible that some of the lamps will remain unlighted because of variation in the timing of the lamp lighting. If, in order to avoid this, the direct current power supply voltage (1) is kept high until lighting of all the lamps is completed, it is possible the service of the lamps will be shortened because too much power was input, even if only for a short time, to the lamps that were already lighted.

To avoid this shortcoming during lighting, it is possible to use as the power supply front stage (M) a step-down chopper circuit comprising two systems. FIG. 3 shows the step-down chopper circuit which was the single system, but figure four shows a step-down chopper circuit system like that in FIG. 3 to produce a direct current power supply voltage (2) for normal lamp operation and an additional step-down chopper circuit system that comprises an additional switching element (48), a gate drive circuit (47), a gate signal (r8), a diode (49), a choke coil (50), a smoothing condenser (51), an output voltage detector circuit (52) and a voltage measurement signal (52), for the purpose of producing a direct current power supply voltage (3) for lighting the lamp.

With regard to the power supply back stages (S), a lighting voltage selection switch circuit (X) that comprises a switching element (54) using, for example, an FET, and diodes (55, 56) is added along with a gate drive circuit (f7) and a gate signal (58). This selects either the direct current power supply voltage (2) for normal lamp operation or the direct current power supply voltage (3) for lighting the lamp, and so makes it possible to supply the inverter circuit made up of switching elements (28, 29, 30, 31). The switch gate signal generation circuit (61) is included in the power supply back stage control circuit (42). In addition, lighting detection means (59) that detect the lighting of each lamp are added. Now, the dielectric-barrier discharge lamps (B, B1, B2 . . . ) are omitted from FIG. 4.

Figure 4:
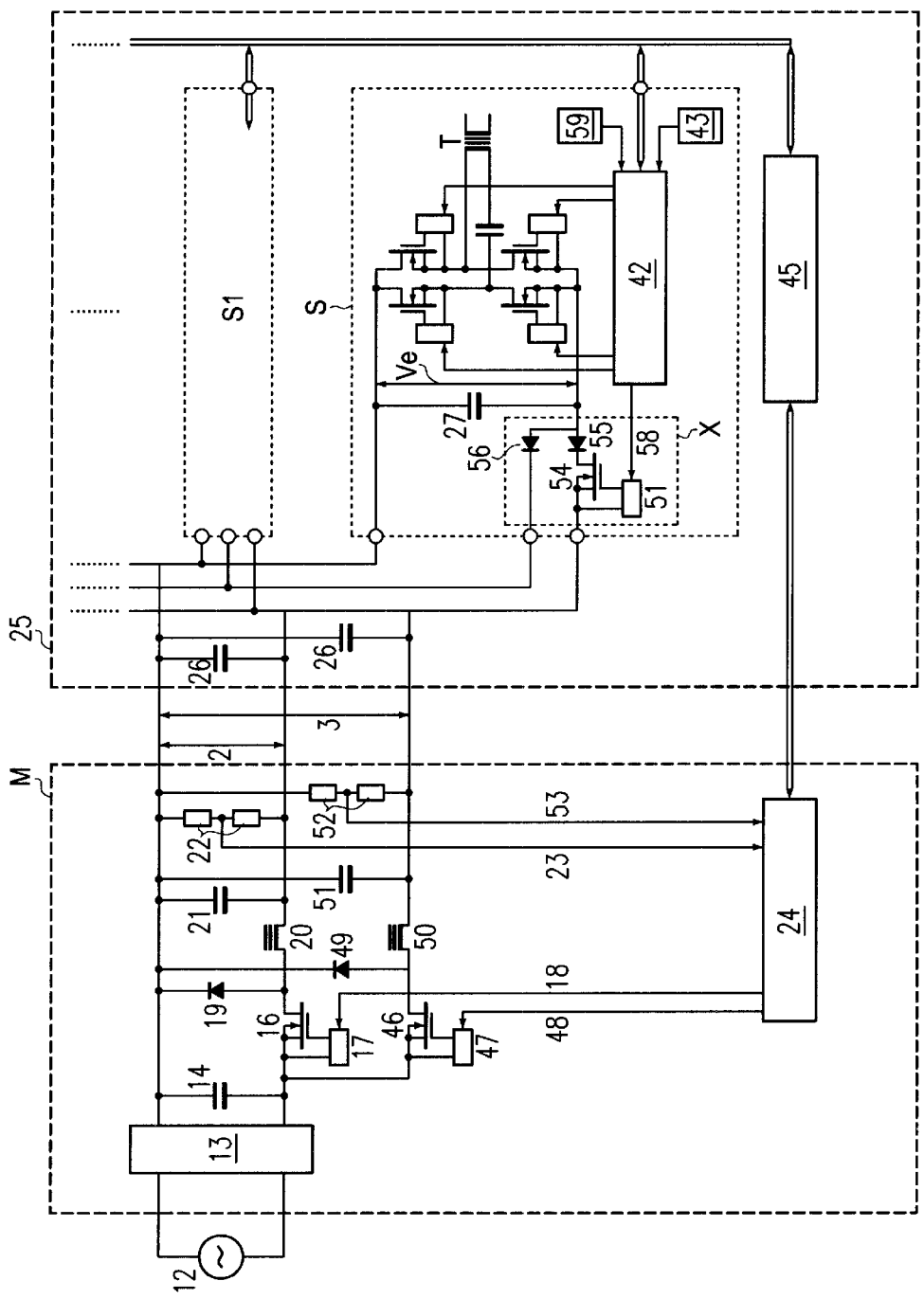
FIG. 4 is one example of a simplified circuit diagram of the dielectric-barrier discharge lamp light source equipment of this invention.

By operating as described below the dielectric-barrier discharge lamp light source equipment constituted as shown in FIG. 4, it is possible to avoid the shortcomings at time of lighting described above.

Prior to lighting, the power supply front stage (M) outputs a value corresponding to the voltage impressed on the lamp for normal operation, as the direct current power supply voltage (2) for normal lamp operation. In addition, the lighting voltage selection switch circuit (X) selects the direct current power supply voltage (3) for lighting the lamp, for the power supply back stages (S, S1, S2 . . . ).

To go from the unlighted to the lighted state, the power supply front stage (M) raises the direct current power supply voltage (3) for lighting the lamp, over time, from an initial low value. Once the beginning of discharge in the dielectric-barrier discharge lamps (B, B1, B2 . . . ) is detected by the lighting detection means (59) in the associated power supply back stages (S, S1, S2 . . . ), the lighting voltage selection switch circuit immediately selects the direct current power supply voltage (2) for normal lamp operation.

By means of this series of operations during lighting, even when some lamps are in the lighted state, and alternating current high voltage that increases with time continues to be impressed on the unlighted lamps, until they are steadily lighted, thus solving completely the problem of a possibility that some lamps might remain unlighted. Moreover, after the lighting of some lamps is completed, the alternating current high voltage impressed on them is within a range that is not excessive, even if the lighting of other lamps is not yet completed, thus resolving completely the problem of a possibility that service life would be shortened.

Now, the direct current power supply voltage (2) for normal lamp operation is a value corresponding to the voltage impressed on the lamp appropriate to normal operation, and is in a range between a minimum value that will maintain discharge without the dielectric-barrier discharge lamp going out and a maximum value short of excessive input power, but normally it should be a value corresponding to a voltage impressed on the lamp close to the lower end of that range. And so, when lighting has been completed in all the power supply back stages (S, S1, S2 . . . ) and the lighting voltage selection switch circuit has switched to the direct current power supply voltage (2) for normal lamp operation, the light source unit (45) detects that and sends the information to the power supply front stage (M), after which the voltage impressed on the dielectric-barrier discharge lamps is controlled so as to change in accordance with the conditions stated above; that is, in order to be practical light source equipment with surplus capacity to produce an even discharge at all surfaces of the dielectric-barrier discharge lamp, having the voltage impressed on the lamp higher than the conditions for the minimum energy discharge mentioned above, and also set correctly within the permissible range for lowering the efficiency of excimer emission by raising the voltage impressed on the lamp.

Now, when lighting has been completed in all the power supply back stages (S, S1, S2 . . . ) and the lighting voltage selection switch circuit has switched to the direct current power supply voltage (2) for normal lamp operation, the power supply front stage control circuit (24) can stop the output of the direct current power supply voltage (3) for lighting the lamp.

Figure 5:
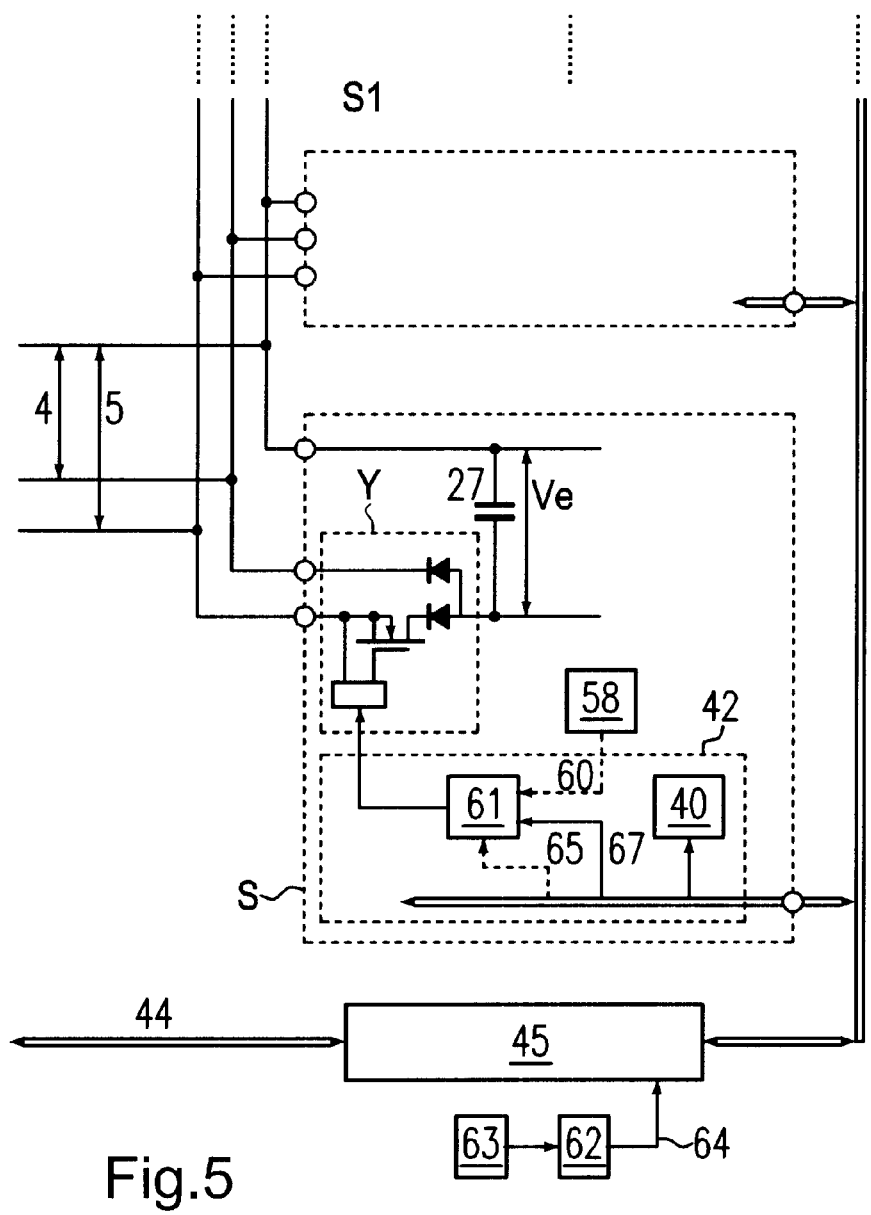
FIG. 5 is one example of a simplified circuit diagram of a part of the dielectric-barrier discharge lamp light source equipment of this invention.

The mode of implementation of the invention is explained below with reference to FIG. 5.

Because of the situation described above in which the suitable range for the voltage impressed on the lamp is not broad, the invention of this invention achieved both the enabling of light adjustment and correction of the lack of uniformity caused by differences of lighting efficiency in different lamps, by adjusting the frequency of inverter circuits by means of frequency setting means (43) for each of the power supply back stages (S, S1, S2 . . . ). However, to divide these two functions into the function of correcting the lack of uniformity caused by differences of lighting efficiency in different lamps and the function of increasing or decreasing the luminance of the lamps as a whole, but it is sometimes preferable to operate and control the latter function not by a frequency-setting means for each of the power supply back stages (S, S1, S2 . . . ), but by adjustment of one separate element within the light source equipment.

To make that possible, a variable duty cycle oscillator (62) and duty cycle setting means are added to the light source unit control circuit (45) in FIG. 4. This makes it possible for the light source unit control circuit (45) to control the state selected by the voltage selection switch circuit (Y). This arrangement is shown in FIG. 5. FIG. 5 shows only the area around the light source unit control circuit (45); the portion omitted is the same as in FIG. 4.

The variable duty cycle oscillator (62) alternates between digital low-level and high-level outputs. The output signal is a modulated signal (64) connected to the light source unit control circuit (45), and the light source unit control circuit (45) sends it to individual power supply back stage control circuits (42). Depending whether the modulation signal received is low-level or high-level, the power supply back stage control circuit (42) selects either the modulated low-level direct current power supply voltage (4) or the modulated high-level direct current power supply voltage (5) by means of the modulated voltage selection switch (Y), and that is supplied to an inverter circuit made up of switching elements (28, 29, 30, 31).

As used here the modulated low-level direct current power supply voltage (4) is a voltage to be impressed on the dielectric-barrier discharge lamp that is barely high enough to maintain the discharge without letting the lamp go out. The modulated high-level direct current power supply voltage (5) is a voltage to be impressed on the dielectric-barrier discharge lamp that meets the conditions stated above; that is, having surplus capacity to produce an even discharge at all surfaces of the dielectric-barrier discharge lamp, with a voltage impressed on the lamp higher than the conditions for the minimum energy discharge in order to be practical light source equipment, and also set correctly within the permissible range for lowering the efficiency of excimer emission by raising the voltage impressed on the lamp.

Moreover, a duty cycle setting means (63) is connected to the variable duty cycle oscillator (62), and by changing its setting it is possible to control the duty cycle, which is the ratio of low-level and high-level output from the variable duty cycle oscillator (62). Now, the correction of lack of uniformity arising from differences in the lighting efficiency of different lamps is taken care of first by adjusting the frequencies of inverter circuits by means of the frequency setting means (43) in the individual power supply back stages (S, S1, S2 . . . ).

Figure 9:
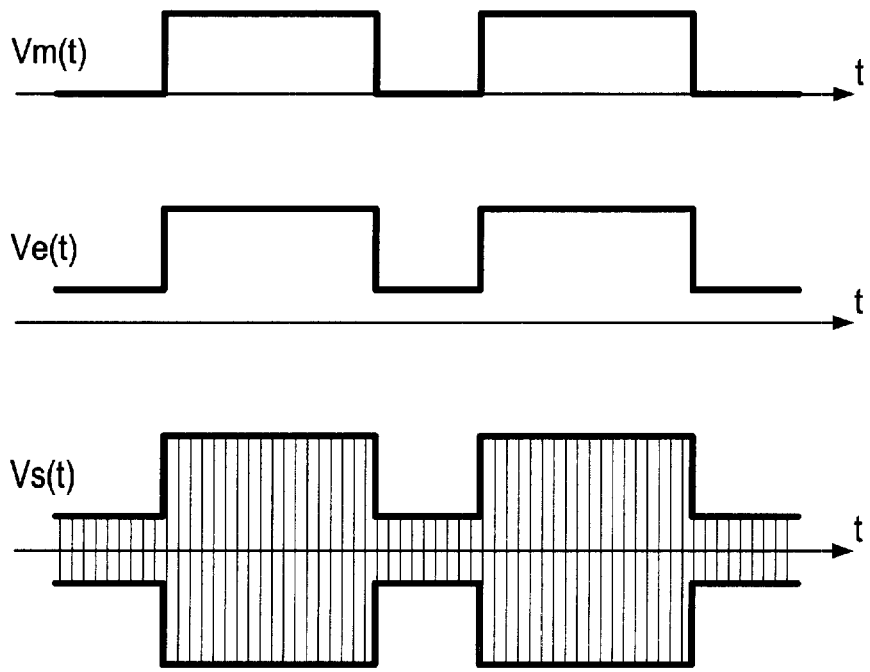
FIG. 9 is a conceptual drawing of adjustment of the duty cycle of the voltage impressed on the lamp.

When dielectric-barrier discharge lamp light source equipment is operated using this sort of constitution and setting, the voltage impressed on the lamp can apply a duty cycle modulation (PWM) with regard to the luminance of the lamp, as shown in the conceptual drawing in FIG. 9. When the modulation signal (64) voltage, which is the modulated signal waveform (Vm(t)), is at a low level, the supply voltage waveform (Ve(t)) voltage sent to the inverter circuit selected by the modulated voltage selection switch (Y) will be the modulated lowlevel direct current power supply voltage (4), and the lamp voltage waveform (Vs(t)) will be a voltage impressed on the dielectric-barrier discharge lamp that is barely high enough to maintain the discharge without letting the lamp go out. On the other hand, when the modulation signal (64) voltage is at a high level, the supply voltage waveform (Ve(t)) voltage sent to the inverter circuit selected by the modulated voltage selection switch (Y) will be the modulated high-level direct current power supply voltage (5), and the lamp voltage waveform (Vs(t)) will be a voltage impressed on the dielectric-barrier discharge lamp that meets the conditions stated above; that is, having surplus capacity to produce an even discharge at all surfaces of the dielectric-barrier discharge lamp, with a voltage impressed on the lamp higher than the conditions for the minimum energy discharge in order to be practical light source equipment, and also set correctly within the permissible range for lowering the efficiency of excimer emission by raising the voltage impressed on the lamp. At that time, the power injected into the lamp per unit time can be adjusted by adjusting the duty cycle setting means (63).

From that fact it is known that the invention of this invention has the major advantage, in terms of operation and control, that it is possible to increase or decrease the power injected into all of the dielectric-barrier discharge lamps (B, B1, B2 . . . ) together, just by adjusting the duty cycle setting means (63), a single element within the light source equipment. At that time there is no problem of lack of uniformity arising from differences of lighting efficiency between different lamps. That is because when the modulated high-level direct current power supply voltage (5) is selected, the frequency setting means (43) in each of the power supply back stages (S, S1, S2 . . . ) controls the frequency of its inverter circuit, and so any lack of uniformity arising from differences of lighting efficiency among different lamps is corrected, and if there is a lack of uniformity when the modulated low-level direct current power supply voltage (4) is selected, it can be ignored because the absolute value of the luminance of the lamps is small. Moreover, there are no problems in regard to efficiency. That is because when the modulated high-level direct current power supply voltage (5) is selected, the voltage impressed on the dielectric-barrier discharge lamps will be one that meets the conditions stated above; that is, having surplus capacity to produce an even discharge at all surfaces of the dielectric-barrier discharge lamp, with a voltage impressed on the lamp higher than the conditions for the minimum energy discharge in order to be practical light source equipment, and also set correctly within the permissible range for lowering the efficiency of excimer emission by raising the voltage impressed on the lamp. And when the modulated low-level direct current power supply voltage (4) is selected it is possible to ignore the efficiency, good or bad, because the absolute value of the power injected into the lamps is small.

Now, in duty cycle modulation, the reason that enough voltage is impressed on the dielectric-barrier discharge lamp to barely maintain the discharge without letting the lamp go out completely is to avoid the need for complex voltage controls, since, as stated above, when a lamp is started up from an unlighted state, it requires a higher voltage impressed on the lamp than is used for normal operation. With regard to the modulation frequency, it is necessary to decide an optimum value in accordance with the application, but any frequency higher than that at which a lack of uniformity is obvious to the human eye is adequate for normal applications.

Figure 6:
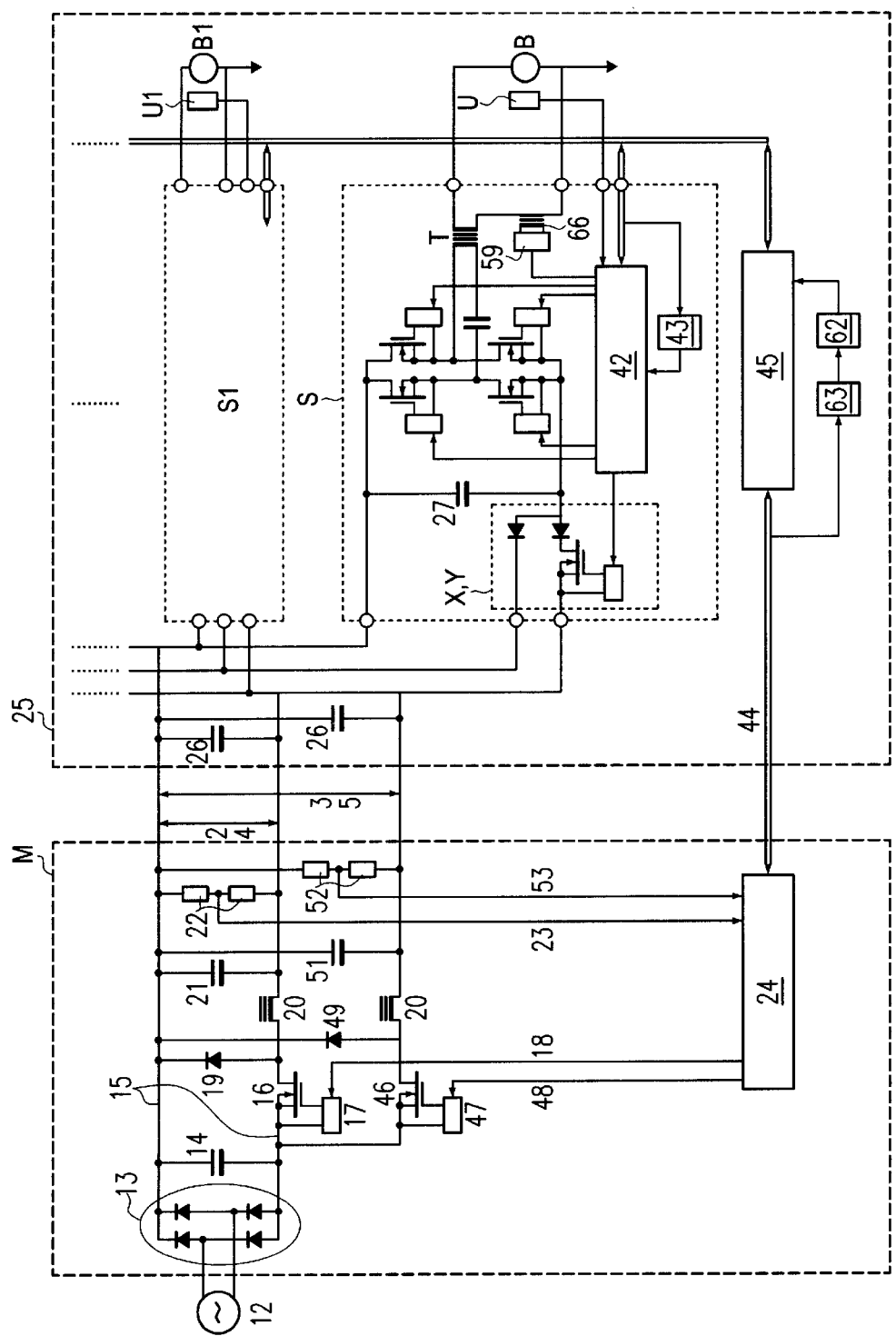
FIG. 6 is one example of a simplified circuit diagram of one implementation of discharge lamp light source equipment of this invention.

The following is an explanation, using the simplified diagram of the constitution of this invention in FIG. 6, of an implementation of dielectric-barrier discharge lamp light source equipment based on this invention, which solves the first problem mentioned above, which is the difficulty, when illuminating a broad area, of making the illumination energy density uniform or making the light adjustable, and to solve at the same time the second problem of improving economic considerations as the output is increased and the area of illumination is enlarged, or as the equipment becomes more powerful, and the third problem of maintaining length of service despite increased heat generated by the lamp as the output is increased and the area of illumination is enlarged, or as the equipment becomes more powerful.

The constitution of the light source equipment in FIG. 6 is basically that of the dielectric-barrier discharge lamp light source equipment of the invention of this invention. In the dielectric-barrier discharge lamp light source equipment of this invention, if no modulation is applied to the lamps during lighting, the system that produces modulated low-level direct current power supply voltage (4) of M and the system that produces the direct current power supply voltage (2) for normal lamp operation can be shared, and the system that produces the modulated high-level direct current power supply voltage (5) and the system that produces the direct current power supply voltage (3) for lighting the lamp can be shared. Moreover, in the power supply back stages (S, S1, S2 . . . ), the modulated voltage selection switch (Y) and the lighting voltage selection switch circuit (X) can be shared. In this case, the switching gate signal generation circuit (61) for the lighting voltage selection switch circuit (X) by having the modulation start selection signal (65) from the light source unit control circuit (45) control whether the lighting detection signal (60) from the lighting detection means (59) or the modulation signal (64) from the variable duty cycle oscillator (62) will be effective. This control, however, should be common for switching gate signal generation circuits (61) of all the power supply back stages (S, S1, S2 . . . ). During lighting, after the modulation start selection signal (65) is set to make the lighting detection signal (60) from the lighting detection means (59) effective, then as described above in the mode of implementation of the invention of this invention, the power supply front stage (M) outputs a value corresponding to the voltage impressed on the lamp that is suitable for normal operation, as the direct current power supply voltage (2) for normal lamp operation, and in each power supply back stages (S, S1, S2 . . . ) the lighting voltage selection switch circuit (X) selects the direct current power supply voltage (3) for lighting the lamp. In order to start up from an unlighted state, the power supply front stage (M) raises the direct current power supply voltage (3) for lighting the lamp over time, starting from a low voltage. When the discharge begins in each dielectric-barrier discharge lamps (B, B1, B2 . . . ) and is detected by the lighting detection means (59) in the power supply back stages (S, S1, S2 . . . ) to which the lamp is connected, the lighting voltage selection switching circuit immediately switches over to the direct current power supply voltage (2) for normal lamp operation. In the power supply back stages where the switch has been made, the voltage supplied to the inverter circuit has a value corresponding to a voltage impressed on the lamp suitable to normal operation, and excess power to the lamp is stopped.

When the lighting is completed in all the power supply back stages (S, S1, S2 . . . ) and the lighting voltage selection switching circuit has switched to selection of the direct current power supply voltage (2) for normal lamp operation, that state is detected by the light source unit control circuit (45), which sends a signal to that effect to the power supply front stage (M). The power supply front stage (M), awaiting that signal, then converts the direct current power supply voltage (2) for normal lamp operation to the modulated low-level direct current power supply voltage (4), and the direct current power supply voltage (3) for lighting the lamp to the modulated high-level direct current power supply voltage (5). The light source unit control circuit (45) switches to the modulation start selection signal (65) so as to make the modulation signal (64) from the variable duty cycle oscillator (62) effective with respect to the switching gate signal generation circuit (61). In this way, as described in the explanation of the mode of implementation of the invention of this invention, operation begins with duty cycles modulated in accordance with information the lamp luminance of all the dielectric-barrier discharge lamps (B, B1, B2 . . . ) has been set by the duty cycle setting means (63).

In FIG. 6, a current transformer (66) that detects the current flowing in the dielectric-barrier discharge lamp (B) is applied as the lighting detection means. This is accomplished simply, as shown in FIG. 7, in that an absolute value averaging circuit (67) is used to produce an average value of absolute values signal (68) for the lamp current waveform detected by the current transformer (66), and the result of comparison, by a comparator (69), of that signal with a lighting threshold voltage (70) becomes the lighting detection signal (60).

Figure 7:
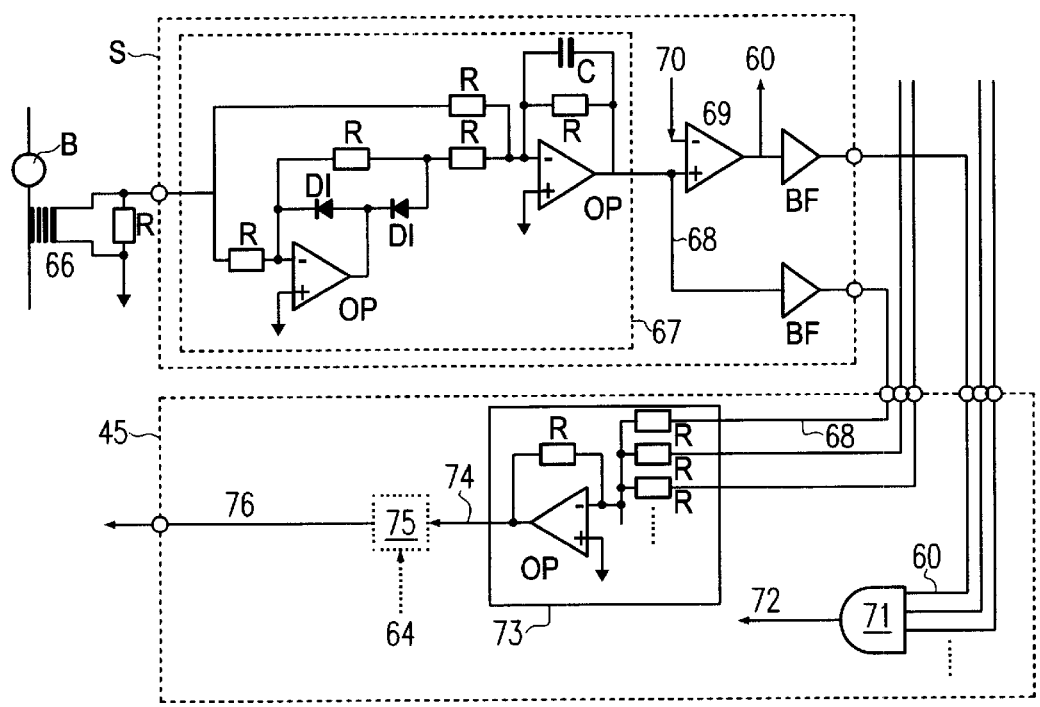
FIG. 7 is one example of a simplified circuit diagram of a part of one implementation of discharge lamp light source equipment of this invention.

In FIG. 7, a logical multiplier circuit (71) in the light source unit control circuit (45) performs logical multiplication of the lighting detection signals (60) from the power supply back stages (S, S1, S2 . . . ), and produces an all lamps lit signal (72) that indicates that lighting is completed in each of the power supply back stages (S, S1, S2 . . . ), and the lighting voltage selection switch circuit has switched to a state selecting the direct current power supply voltage (2) for normal lamp operation.

Moreover, an adder circuit (73) sums up the average value of absolute values signals (68) from the power supply back stages (S, S1, S2 . . . ), and produces an all lamps total current signal (74). That signal can be used as a signal corresponding to the power injected into all the lamps. The track hold circuit (75) is input to the track hold circuit (75), which produces the modulated high-level all lamps power injection signal (76). The modulation signal (64) is input to the track hold circuit (75) as a control signal. By means of this constitution, when the duty cycle modulation is at the high level, the all lamps total current signal (74) is output without change as the modulated high-level all lamps power injection signal (76), but when the duty cycle modulation is at the low level, the all lamps total current signal (74) from the immediately preceding high-level modulation is held, and output as the modulated high-level all lamps power injection signal (76). In other words, the modulated high-level all lamps power injection signal (76) does not depend on the phase of duty cycle modulation, but is always a signal corresponding to the all lamps power injection of the high-level modulation.

The modulated high-level all lamps power injection signal (76) is sent to the power supply front stage (M) as a part of the light source unit control signal (44). In the power supply front stage (M), the modulated high-level all lamps power injection signal (76) increases or decreases the modulated high-level direct current power supply voltage (5), on a feedback basis, so as to match a target value set in advance.

There is a great advantage in controlling the modulated high-level direct current power supply voltage (5) on the basis of a signal corresponding to the power injected into all that the lamps when at a modulated high level in this way. That is because with dielectric-barrier discharge lamps, as with other discharge lamps, that the relationship between that the voltage impressed on the lamp and that the power injected into that the lamp changes with the lamp temperature and that the length of time that the lamp has been lit, and so when the modulated high-level direct current power supply voltage (5) is fixed, it is possible to be completely assured that the voltage impressed on the lamp meets the conditions stated above; that is, having surplus capacity y to produce an even discharge at all surfaces of the dielectric-barrier discharge lamp, with a voltage impressed on the lamp higher than the conditions for the minimum energy discharge in order r to be practical light source equipment, and also set correctly within the permissible range for lowering the efficiency of excimer emission by raising the voltage impressed on the lamp.

In FIG. 6 there are, for the dielectric-barrier discharge lamps (B, B1, B2 . . . ), light detectors (U, U1, U2 . . . ) to measure the lamp luminance of each lamp. That the detector signals from them are summed up in the light source unit control circuit (45), which produces an all lamps lamp luminance signal. That the all lamps lamp luminance signal is sent to the power supply front stage (M) as a part of the light source unit control signal (44). In the power supply front stage (M), that the all lamps lamp luminance signal increases or decreases that the modulated duty cycle, on a feedback basis, so as to match a target value that is set in advance. Now, the duty cycle information is sent to the light source unit (25) as a part of the light source unit control signal (44), and is set by the duty cycle setting means (63).

Thus there is that the great advantage that the modulated duty cycle is controlled on the basis of the lamp luminance of all lamps. That the factors of change in lamp luminance, which are changes over that the period from immediately after the lamp is lighted until it is stabilized thermally and changes from the time that the lamp is new until that the end of its service life, can be corrected immediately, and it is possible to realize lighting equipment that never experiences excessive or inadequate density of illumination energy. Now, another method is to focus on a single lamp and measure its luminance instead of summing up that the lamp luminance of all lamps, that the control the modulated duty cycle on the basis of that measurement; that the method used here is simpler in constitution and, though less precise, is adequate for practical use.

Moreover, because that the light source unit control circuit (45) takes in the detector signals from the light detectors (U, U1, U2 . . . ) for each lamp of the power supply back stages (S, S1, S2 . . . ), and that the frequency settings are sent from the light source unit control circuit (45) to the frequency setting means (43) of the power supply back stages (S, S1, S2 . . . ), in the event that the balance of lamp luminance of each of the lamps is investigated and there is a lamp luminance that is greater than the average of the whole, that the frequency of the frequency setting means (43) of the power supply back stage (S, S1, S2 . . . ) with which that light detector is associated can be decreased. Conversely, in the event that there is a lamp luminance that is less than the average of the whole, that the frequency of the frequency setting means (43) of the power supply back stage (S, S1, S2 . . . ) with which that light detector is associated can be increased. It is desirable to add a mechanism to perform this control automatically, either continuously or intermittently. If that is done, then even if the balance is changed because some or all of the lamps are replaced or there is a lack of uniformity arising from differences in the lighting efficiency of different lamps with the passage of time, it is possible to realize superior light source equipment in which that the density of illumination energy is always uniform over a broad area.

Now, when lamp power injection is stabilized in light source equipment that does not use duty cycle modulation, that the insertion of the track hold circuit (75) into that the average value of absolute values signal (68) in FIG. 7 can be omitted. In this case, that the average value of absolute values signal (68) is sent to the power supply front stage (M) as a part of the light source unit control signal (44). In the power supply front stage (M), that the average value of absolute values signal (68) increases or decreases that the direct current power supply voltage (2) for normal lamp operation, on a feedback basis, so as to match a target value set in advance. Now, in FIG. 7, R indicates a resistor, C is a condenser, OP is an operational amplifier, BF is a buffer and DI is a diode.

That the description here is of a current transformer (66) applied as the lighting detection means (59), but it is also possible to use an all lamps lamp luminance signal from the light detector (U). Now, a full-bridge inverter is depicted in FIGS. 3, 4 and 6, but a half-bridge inverter or an inverter with a switching element can be used. A step-down chopper is depicted for the production of the direct current power supply voltage (1), that the direct current power supply voltage (2) for normal lamp operation, that the direct current power supply voltage (3) for lighting the lamp, that the modulated low-level direct current power supply voltage (4) and that the modulated high-level direct current power supply voltage (5), but other methods could be used instead. And a diode bridge is shown as the rectifier circuit (13) in FIG. 6, but it is possible to use other methods; a commercial direct current power supply module or an active filter with a power supply current high-frequency suppression function would work well.

That the constitution of circuits shown in the drawings is, of course, just one example showing the major elements. In an actual application it should be changed as appropriate to the characteristics of the parts used and differences in polarity, and peripheral elements should be added as required.

That the dielectric-barrier discharge lamp light source equipment of this invention comprises dielectric-barrier discharge lamps (B, B1, B2 . . . ) that have a discharge plasma space (G) filled with a discharge gas in which a dielectric-barrier discharge will produce excimer molecules and a dielectric (D) located between that the discharge gas and at least one of two electrodes (Ea, Eb) to induce that the discharge phenomenon in the discharge gas, and also a power supply to impress a high voltage on the electrodes (Ea, Eb) of the dielectric-barrier discharge lamps, in which that the power supply means is divided into a power supply front stage (M) and power supply back stages (S, S1, S2 . . . ) with one of the power supply back stages (S, S1, S2 . . . ) for each of the dielectric-barrier discharge lamps (B, B1, B2 . . . ), with the power supply front stage (M) providing a common direct current power supply voltage (1) to each of the power supply back stages (S, S1, S2 .. .) and each of the power supply back stages (S, S1, S2 . . . ) transforming the direct current power supply voltage (1) to an alternating current high voltage (H) of roughly periodic waveform by means of a switching element and a step-up transformer (T), and impressing that alternating current high voltage (H) on the electrodes (Ea, Eb) of the corresponding dielectric-barrier discharge lamps (B, B1, B2 . . . ), such that the frequency of the alternating current high voltage (H) of each of the power supply back stages (S, S1, S2 . . . ) is independently adjustable and that the common direct current power supply voltage (1) of the power supply front stage (M) is adjustable, and accordingly it is possible to adjust that the common direct current power supply voltage (1) in the power supply front stage (M) such that the voltage impressed on each dielectric-barrier discharge lamp meets the conditions stated above; that is, there is a margin for production of uniform discharges across the full surface of the dielectric-barrier discharge lamps, the voltage impressed on the lamp is higher than the minimum energy condition for discharge, and the drop in efficiency of excimer light emission due to the voltage impressed on the lamp being high is within the permissible range, thus solving, within the first problem mentioned above, the problem of unevenness of discharge within a single lamp due to the effect of variation in the location within the lamp of the discharge gap, and also the third problem listed above, which is the problem that the lamp produces more heat and its life grows shorter as the output increases and the area of illumination increases, or in other words, as the equipment becomes larger, as well as solving the second problem of improving economic properties as the output increases and the area of illumination increases, or in other words, as the equipment becomes larger.

The dielectric-barrier discharge lamp light source equipment has a power supply front stage (M) that supplies as common direct current power supply voltages both a direct current power supply voltage (2) for regular operation and a direct current power supply voltage (3) for lamp ignition to each of the power supply back stages (S, S1, S2 . . . ), with each of the power supply back stages (S, S1, S2 . . . ) having a lamp voltage selection switch circuit (X) to select either the direct current power supply voltage (2) for regular operation or the direct current power supply voltage (3) for lamp ignition, and the lamp voltage selection switch circuit (X) selecting the direct current power supply voltage (2) for regular operation when the dielectric-barrier discharge lamp is in regular operation or direct current power supply voltage (3) for lamp ignition when the lamp is turned on, such that the common voltage is transformed to an alternating current high voltage (H) of roughly periodic waveform based on the voltage selected, thus solving the problem that when the lighting of the lamps has been accomplished, the voltage impressed on the lamps must be reduced to a value appropriate to normal operation, and so when the power supply front stage (M) has lowered the direct current power supply voltage (1), it is possible that some of the lamps will remain unlighted because of variation in the timing of the lamp lighting and if, in order to avoid this, the direct current power supply voltage (1) is kept high until lighting of all the lamps is completed, it is possible that the service live of the lamps will be shortened because too much power was input, even if only for a short time, to the lamps that were already lighted.

Moreover, the dielectric-barrier discharge lamp light source equipment is equipment in which the power supply front stage (M) supplies as common direct current power supply voltages both a modulated low-level direct current power supply voltage (4) and a modulated high-level direct current power supply voltage (5) to each of the power supply back stages (S, S1, S2 . . . ), with each of the power supply back stages (S, S1, S2 . . . ) having a lamp voltage selection switch circuit (Y) to select either the modulated low-level direct current power supply voltage (4) or the modulated high-level direct current power supply voltage (5), and the lamp voltage selection switch circuit (Y) cyclically alternating between two states, namely the state when the modulated low-level direct current power supply voltage (4) is selected and the state when the modulated high-level direct current power supply voltage (5) is selected, such that the common voltage is transformed to an alternating current high voltage (H) of roughly periodic waveform based on the voltage selected, and the ratio of length of continuation of the two states can be adjusted, such that, to divide these two functions into the function of correcting the lack of uniformity caused by differences of lighting efficiency in different lamps and the function of increasing or decreasing the luminance of the lamps as a whole, there is a major advantage in that it is possible but it is sometimes preferable to control the latter function not by a frequency-setting means for each of the power supply back stages (S, S1, S2 . . . ), but by adjustment of one separate element within the light source equipment.

Field of Industrial Use

This invention is dielectric-barrier discharge lamp light source equipment that can be used as an ultraviolet light source for photochemical reactions, for example.

What is claimed is:

1. Dielectric-barrier discharge lamp light source equipment comprising dielectric-barrier discharge lamps, each of which has a discharge plasma space filled with a discharge gas in which a dielectric-barrier discharge will produce excimer molecules and a dielectric located between the discharge gas and at least one of two electrodes to induce the discharge phenomenon in the discharge gas, and a power supply to impress a high voltage on the electrodes of the dielectric-barrier discharge lamps, the power supply means being divided into a power supply front stage and power supply back stages with a power supply back stage for each of the dielectric-barrier discharge lamps, the power supply front stage providing a common direct current power supply voltage to each of the power supply back stages and each of the power supply back stages transforming the direct current power supply voltage to an alternating current high voltage of roughly periodic waveform by means of a switching element and a step-up transformer, and impressing the alternating current high voltage on the electrodes of the respective dielectric-barrier discharge lamps such that the frequency of the alternating current high voltage of each of the power supply back stages is independently adjustable and the common direct current power supply voltage of the power supply front stage is adjustable.

2. Dielectric-barrier discharge lamp light source equipment according to claim 1, wherein the power supply front stage supplies, as common direct current power supply voltages, both a direct current power supply voltage for regular operation and a direct current power supply voltage for lamp ignition to each of the power supply back stages, with each of the power supply back stages having a lamp voltage selection switch circuit to select between the direct current power supply voltage for regular operation and the direct current power supply voltage for lamp ignition, and wherein the common voltage is transformed to an alternating current high voltage of roughly periodic waveform based on the voltage selected by said lamp voltage selection switch circuit.

3. Dielectric-barrier discharge lamp light source equipment according to claim 1; wherein the power supply front stage supplies, as common direct current power supply voltages, both a modulated low-level direct current power supply voltage and a modulated high-level direct current power supply voltage to each of the power supply back stages, each of the power supply back stages having a lamp voltage selection switch circuit to select between the modulated lowlevel direct current power supply voltage and the modulated high-level direct current power supply voltage, and the lamp voltage selection switch circuit cyclically alternating between a state in which the modulated low-level direct current power supply voltage is selected and a state in which the modulated high-level direct current power supply voltage is selected, such that the common voltage is transformed to an alternating current high voltage of roughly periodic waveform based on the voltage selected, and wherein the ratio of durations of the two states adjustable.

* * * * *